United States Patent [19]

Rosato et al.

[11] 4,414,265
[45] Nov. 8, 1983

[54] INSULATION BOARD

[75] Inventors: Dennis W. Rosato, Lawrenceville; Neil K. Lister, Rahway, both of N.J.

[73] Assignee: Millmaster Onyx Group, Inc., New York, N.Y.

[21] Appl. No.: 474,153

[22] Filed: Mar. 10, 1983

Related U.S. Application Data

[63] Continuation-in-part of Ser. No. 390,249, Jun. 21, 1982, Pat. No. 4,388,366.

[51] Int. Cl.³ ............... B32B 17/10; B32B 5/18; B32B 5/32
[52] U.S. Cl. ................... 428/285; 428/286; 428/288; 428/311.5; 428/316.6; 428/332; 428/401
[58] Field of Search ............ 428/285, 286, 287, 288, 428/311.5, 316.6, 332, 401

[56] References Cited

U.S. PATENT DOCUMENTS

| | | | |
|---|---|---|---|
| 3,483,664 | 12/1969 | Funk et al. | 52/309.6 |
| 3,579,540 | 5/1971 | Ohlhausen | 428/429 |
| 3,756,895 | 9/1973 | Bellamy | 428/311.5 |
| 3,773,603 | 11/1973 | Scholander | 428/311.5 |
| 4,073,997 | 2/1978 | Richards et al. | 428/285 |
| 4,073,998 | 2/1978 | O'Connor | 428/285 |
| 4,086,384 | 4/1978 | Adelman et al. | 428/285 |
| 4,121,958 | 10/1978 | Koonts | 428/311.7 |
| 4,263,360 | 4/1981 | Adelman | 428/311.7 |
| 4,265,962 | 5/1981 | May | 428/284 |

*Primary Examiner*—William J. Van Balen
*Attorney, Agent, or Firm*—Arthur A. Jacobs

[57] ABSTRACT

An insulation board comprising a plastic foam layer which is covered by at least one facer, the facer comprising (a) a sheet of glass fibers bonded to each other by a bonding agent, the fibers and bonding agent being coated with a non-wicking agent, whereby, although the fibrous facing sheet is porous to permit venting of gases and vapors, it is substantially liquid-repellant to prevent bleed through by various types of liquids, and (b) a scrim between the facing sheet and the plastic foam layer, the scrim comprising a sheet, preferably made of glass fibers similar to the facing sheet, and having a pattern of glass strands over one face thereof.

12 Claims, 3 Drawing Figures

INSULATION BOARD

This is a continuation-in-part of application Ser. No. 390,249, filed June 21, 1982, now U.S. Pat. No. 4,388,366.

This invention relates to insulation panels or boards, and it particularly relates to insulation boards that are most satisfactorily utilized in roofing.

As stated in the aforesaid parent application Ser. No. 390,249, a roof construction generally comprises a roof deck which may be made of various materials such as wood, concrete, gypsum, steel, and the like, an insulation barrier above the deck and a roof covering which usually comprises at least one layer of asphalt topped by a felt layer that is topped by another layer of asphalt. Generally about three such successive layers are used. Sometimes a layer of gravel or the like is super-imposed on the top layer of asphalt.

The insulation barrier, itself, may comprise one or more layers of insulating sheets placed on top of each other at the building site or it may comprise a prefabricated laminated board. The laminated type of insulation board generally comprises a plastic foam layer or core, which may be polurethane, polyisocyanate, or the like, and has, at least on one side, a protective or facing layer that may be either rigid or flexible and is usually fire or flame retardant. When there are two such protective layers, one on each side of the foam layer, it is generally referred to as a "sandwich" construction.

Plastic foams are used as core material in sandwich panels because of low heat transmission, rigidity, light weight, moisture-proofness and chemical inertness. Facers that are commonly used include expanded perlite boards, metal foils, organic felt, plywood, hardboard, cement-asbestos board, reinforced plastic, tempered glass and glass fiber board. Since the foam core is isolated from small ignition sources by the facer, ignition resistance depends primarily upon the degree of protection afforded by the facer.

The bottom facers should, in addition, be capable of retarding ingress of fluids because this type of insulation board is usually made by placing the bottom facers on a slatted conveyor belt and applying an even distribution of liquid foam material thereon. The foam, therefore, expands and solidifies during movement of the conveyor. If the facers were to permit bleeding through of the liquid foam material, this material would stick and harden on the conveyor slats, thereby making the conveyor inoperative until cleaned. The necessity for such constant cleaning would seriously impair commercial production.

The ability to vent fluid such as vaporized liquids and gases is important in this type of insulation board. Such fluids may cause frothing or bubbling of the asphalt when the hot asphalt is applied to the facing. Evaporation of liquid fluids, or expansion of entrapped gases and vapors, may cause asphalt blistering. Therefore, there must be some means present for venting fluids such as vaporized liquids or gases.

As stated in the aforesaid parent application Ser. No. 390,249, in order to vent such fluids it has been the usual practice to provide venting base sheets which may be perforated, grooved or ribbed felts that form lateral escape channels for the fluids. However, the invention described in the aforesaid parent application permits the elimination of such venting sheets, thereby greatly decreasing the cost of materials and labor.

Although the invention described and claimed in the aforesaid parent application is very satisfactory for its purpose, it has been found that the porosity of the facing sheets can be considerably reduced (although still retaining sufficient porosity to permit lateral venting of any vapors formed between the foam layer and the roof covering) and the dimensional stability, flexural strength, fastener pull-through strength, board spanability, impact-resistance, wind-uplift performance and surface traffic performance can be considerably improved in a manner which will become better understood by reference to the following description when read in conjunction with the accompnying drawings wherein:

Figure 1:
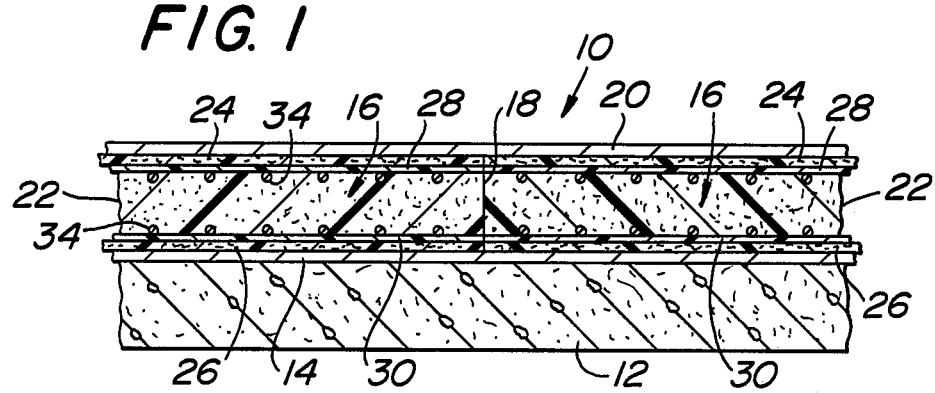
FIG. 1, is a sectional view of an insulated roof construction including the insulation board of the present invention.
Figure 2:
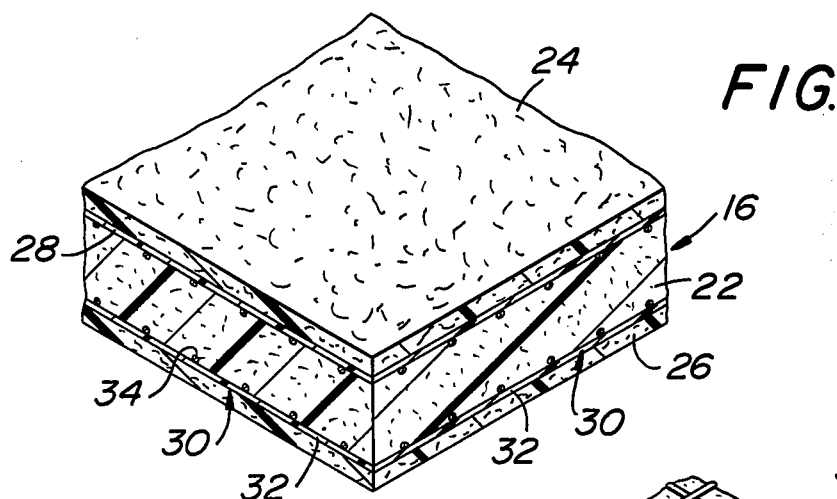
FIG. 2, is a perspective view of an insulation board embodying the present invention.

Referring now in greater detail to the figures of the drawing wherein similar reference characters refer to similar parts, there is shown a roof construction, generally designated 10, which includes a deck 12, here shown as being made of concrete, an asphalt layer 14 above the deck, laterally butted insulation boards, generally designated 16, which are joined at 18, and a roof covering 20. Although not specifically shown, this roof covering is preferably, but not necessarily, a so-called BUR type formed by successive layers of asphalt and roofing felt, usually three to four layers of each.

The insulation boards 16, which are the subject of the present invention, comprise a foam core 22, here shown as being made of polyurethane or polyisocyanate foam, a facer sheet 24 at the top of the foam core and a facer sheet 26 at the bottom of the foam core.

Both of the facer sheets 24 and 26 are of the same construction, and each comprises very fine glass fibers bonded together with polyvinyl acetate; about 90% of the facer being glass.

Attached to each facer sheet is a scrim, as at 28 and 30. Both scrims are of the same size and construction and scrim 30, shown in FIG. 3, is illustrative of both.

Figure 3:
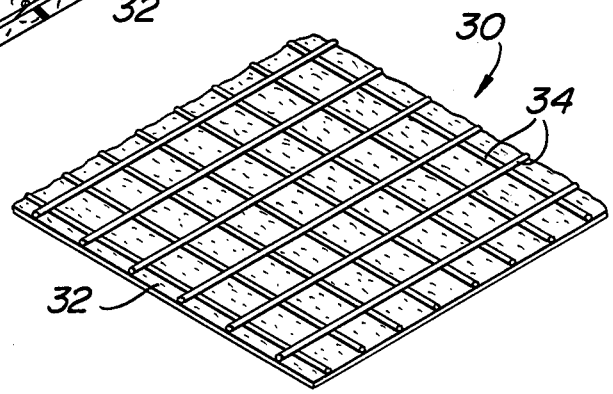
FIG. 3, is a perspective view of a scrim used in the present invention.

The scrim shown in FIG. 3 comprises a glass mat or sheet 32, of the same general construction as the facers 24 and 26, but applied to one face of the mat 32 is a grid formed by glass threads or strands 34. In the scrim of FIG. 3, the glass threads are of about 4 pounds tensile strength and are arranged in a pattern of about 1.8 strands per inch in both directions. The strands are coated and are bound at each contact point with the same type of binder that is used in the production of the mat, which, in this instance, comprises polyvinyl acetate (PVA). The strength of the scrim can be varied by varying the strand diameter and grid pattern, but the pattern shown in FIG. 3 is the most preferable.

The scrims 28 and 30 are generally applied to the respective facer sheets 24 and 26 after the facer sheets have been formed, but while still wet; this reactivates the PVA binder so that no additional binder is required.

The scrims and their method of construction do not form any part of the present invention except insofar as they are used in the combination forming the present insulation boards or panels.

As indicated in the parent application, the thickness of the facers may vary between about 4 to 120 mils, although the preferable range is between about 7 to 30 mils.

As is also indicated in the parent application, the glass fibers are treated with a non-wicking agent such as a fluorcarbon, silicone or silanes. The non-wicking agent is added after the glass fiber product, including both the facer and the scrim, is formed, but while it is still in the wet state. The non-wicking agent coates both the glass fibers and the polyvinyl acetate binder. This coating substantially prevents absorption into or adsorption onto the fibers of any liquids, whereby liquids that enter form beads on the surfaces of the fibers.

In effect, the non-wicking agent is a liquid repellent which permits the facers to shed not only water, but hot asphalt and any liquid foam ingredients. However, there is sufficient absorbancy between the mating surfaces of the foam and facer on the one side and between the hot asphalt and facer on the other side to create a bond. The important thing is that the non-wicking agent prevents total bleeding through of the liquids because the pressure of the liquids is less intense in the interior of the facing sheets than at the interfaces with the other materials.

The above-described facer structure, including both the facing sheet and the scrim, although capable of repelling liquids, thereby preventing impregnation and bleed-through by either hot asphalt or liquid foam ingredients, is nevertheless porous because of the fiber construction so that it will not trap any vapors. Since it is porous, it permits lateral venting of any vapors from between the foam layer and the roof covering.

Facers or panels of the above-described construction, including the combination of facing sheet and scrim, are commercially available and, in themselves, do not constitute any part of the present invention except insofar as they are used in the present combination to form the facers for insulation boards of the present type.

Both the mat and strand portions of the scrims 28 and 30 have been described as made of glass; however, they may be constructed of other materials such as nylon, polyester, polyolefin, etc.. Nevertheless, the glass is preferable because of its inorganic nature, which makes it generally more flame-resistant than organic polymers.

As stated in the aforesaid parent application, this invention has been illustrated in the form of "sandwich" panels or boards wherein the foam layer is covered with a facer on both sides, it may also embrace a board having a facer of this type only on one side. The other side may have another type of facer or none at all, depending on the manner in which it is to be used. Furthermore, although the invention has been described with particular relation to roofing, it is also possible to utilize these boards for other types of insulation.

The invention claimed is:

1. An insulation board comprising a plastic foam layer covered by at least one facing panel, said panel comprising a facing sheet, said facing sheet comprising glass fibers which are randomly dispersed in uniform fashion throughout the sheet, said fibers being bonded together by a bonding agent, and said fibers and bonding agent being coated by a non-wicking agent to provide a porous but liquid-repellent structure, said panel also including a scrim, said scrim being positioned between the facing sheet and the foam layer, the scrim comprising a glass fiber mat wherein the fibers are randomly dispersed and bonded together by a bonding agent, and wherein a pattern of glass strands are bonded to at least one face of the mat.

2. The insulation board of claim 1 wherein the strands are arranged in the form of a grid pattern.

3. The insulation board of claim 1 wherein the strands are arranged in the form of a grid pattern having crossed strands wherein the strands are bonded together at their intersections.

4. The insulation board of claim 1 wherein the strands are of about 4 pounds tensile strength and are arranged in a grid pattern of about 1.8 strands per inch in both directions of the grid.

5. The insulation board of claim 1 wherein the scrim is bonded to the facing sheet.

6. The insulation board of claim 1 wherein the scrim is bonded to the facing sheet by the same bonding agent that bonds the fibers of the facing sheet together.

7. The insulation board of claim 1 wherein the glass fibers constitute about 90 percent by volume of the facing sheet.

8. The insulation board of claim 1 wherein the facing sheet has a thickness of between about 4 to 120 mils.

9. The insulation board of claim 1 wherein the facing sheet has a thickness of between about 7 to 30 mils.

10. The insulation board of claim 1 wherein the glass fibers in the facing sheet have diameters of between about 3.75 to about 13.0 microns and lengths of between about 0.25 to about 1.0 inch.

11. The insulation board of claim 1 wherein a facing sheet is bonded to each side of said plastic foam.

12. The insulation board of claim 1 wherever the fibers and bonding agent of the scrim are also coated by a non-wicking agent.

* * * * *